United States Patent Office 3,264,935
Patented August 9, 1966

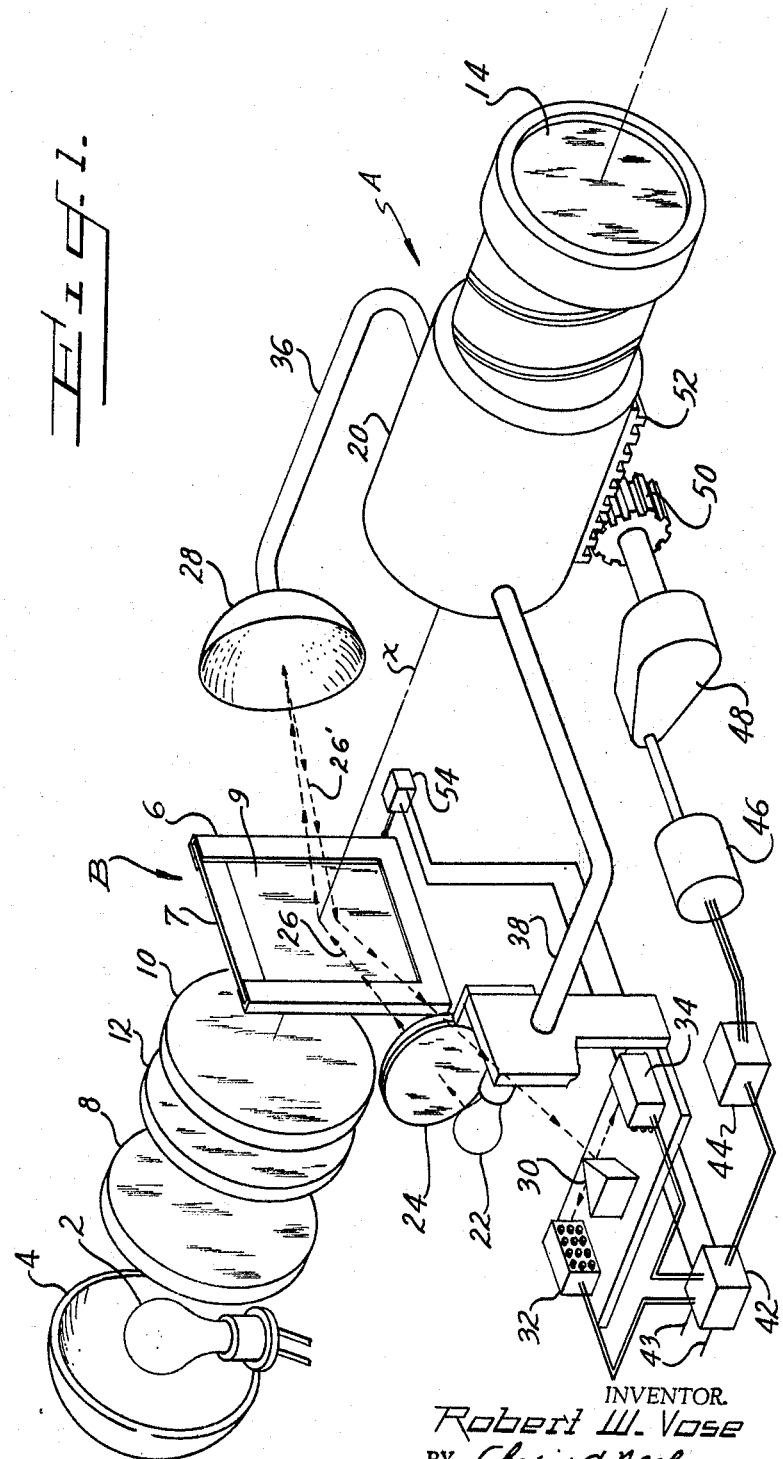

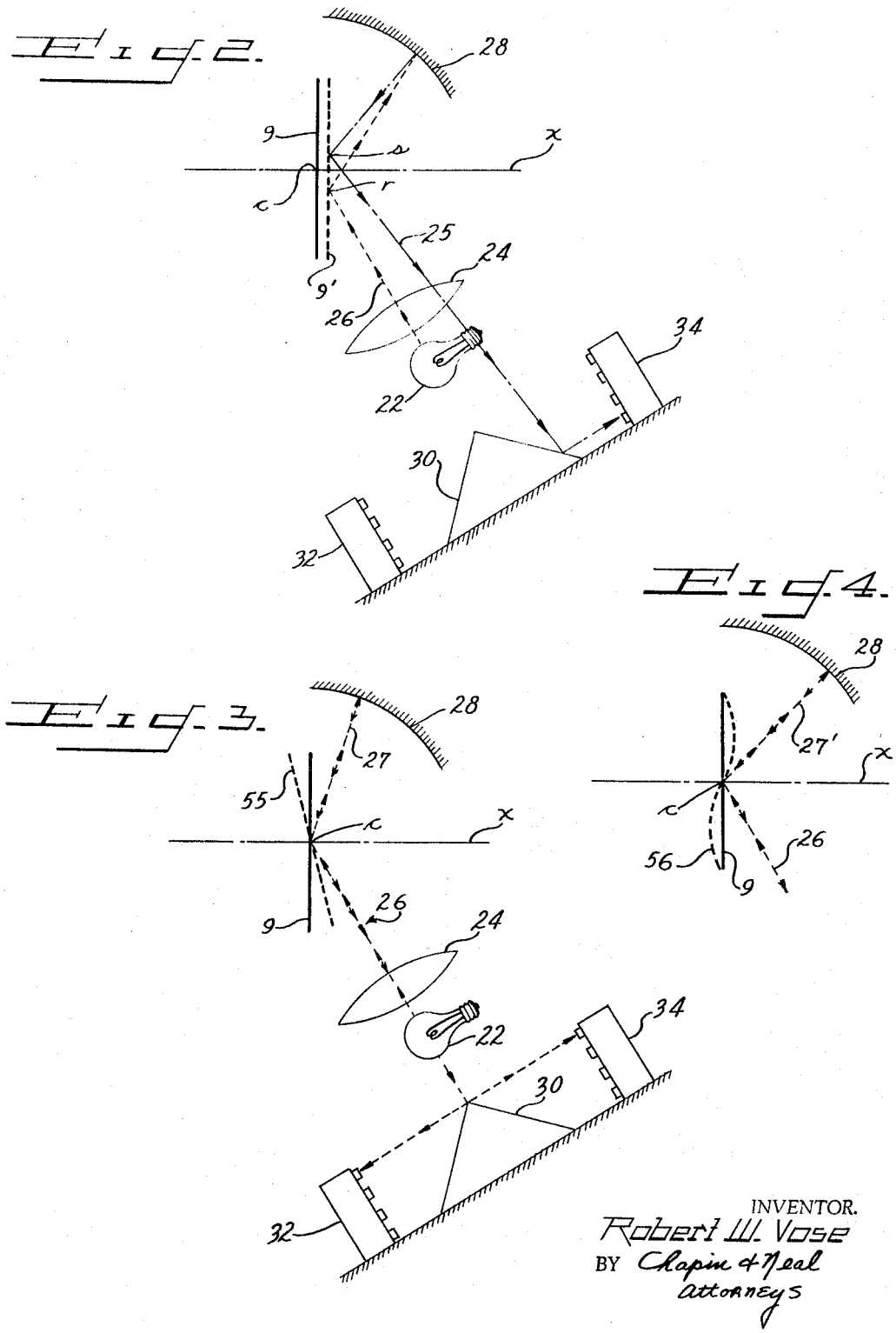

3,264,935
SELF-FOCUSING SLIDE PROJECTOR
Robert W. Vose, 1528 Piper Road, West Springfield, Mass.
Filed Jan. 6, 1964, Ser. No. 335,880
4 Claims. (Cl. 88—24)

This invention relates to automatic focusing systems for optical equipment and particularly to self-focusing optical systems used for handling a succession of objects to be viewed, each of the objects being provided with an approximately planar face. More particularly the invention relates to self-focusing projector equipment and the like, a typical example being the conventional slide projector used to show flexible photographic films, as 35 mm. color slides, on a viewing screen.

It is a common experience, when using conventional slide projector equipment with a viewing screen, for the projected images to be out of focus on the screen from time to time. It therefore frequently becomes necessary to manually readjust the lens focusing system in order to obtain a sharp, clear image for each of the slides. This is annoying and time consuming for the one operating the equipment. When the equipment is being used for lecturing purposes, it is in addition a serious drawback to an effective presentation since it interrupts the concentration of both the lecturer and his audience.

The need to refocus is caused by the fact that slide films for projectors are mounted in cardboard frames which may be of varying thicknesses and types. Different developing processors furnish original mountings according to their individual preferences. Thus the frames may vary in thickness or in the degree of flatness according to original mounting specifications, the frame characteristics, prevailing humidity and temperature conditions and many other factors. As a result, the location of the actual film surface and the image bearing emulsion which it carries, with relation to the edges of the mounting on which the slide must be held, can vary by considerable amounts.

Some attempt has been made to alleviate the trouble accompanying the need for frequent refocusing by providing conventional slide projectors with motorized fine-focusing mechanisms having remote control means easily available to an operator or lecturer. While the refocusing operation is thus made more convenient the basic problem still remains in that a conscious effort and time is still required. This, of course, still creates a distraction from the subject matter.

It is the principal objet of this invention to provide means for automatically refocusing the projector or similar optical apparatus as each successive slide is placed in position for projection, and if refocusing is needed, to do this immediately and without attention from the operator.

It is another object of this invention to provide a focusing means for projectors which is capable of differentiating between true positional errors of the film plane and those merely caused by a warped or tilted transparency for which true focusing over the entire film plane is not possible. In this way, the predetermined focusing of the system is not thrown off by defective transparencies.

The above and other objects of this invention will be more readily apparent from the following description and with reference to the accompanying drawings, in which:

FIG. 1 is a schematic drawing showing one type of projection system embodying the invention; and FIGS. 2, 3, and 4 are diagrammatical views illustrative of the operation of the focusing system embodying the invention.

In accordance with the invention as herein disclosed the automatic focusing is achieved by sensing the location of the plane of the film in each slide relative to the lens of the projector and the viewing screen, the lens having initially been focused by manual adjustment to obtain a setting giving a sharp, clear image on the screen for a first slide. Any deviation of a subsequent slide film from this predetermined position, which may be called the object plane of the projection lens, automatically results in changing the spaced relation between the film surface and lens to re-establish coincidence of the film and the object plane so as to result in a sharp, clear image for each slide. Thus, deviations in the geometry of film mounting frames are automatically compensated for. More specifically, the mechanism to be described performs this automatic refocusing by a sensing means comprising a light beam doubly reflected from the surface of the film and photoelectric transducers responsive to deviations in the reflected beam. The sensing means serves to operate a servomechanism and if necessary, to correct the position of the film surface so that it is shifted to coincide with the preselected object plane location. Thus, if a slide-lens-screen system is brought into sharp focus with a first initial slide film, then all subsequent slide film surfaces will be brought into the same position automatically and therefore in proper focus for showing, clear, sharp images.

In FIG. 1 the elements of a conventional optical slide projection system are shown. A lens system unit is generally indicated by A. B indicates a means for holding objects having a planar surface such as a slide frame holder. Holder B is positioned on the optical axis $x$ of the lens, it being readily understood that an image of an object, as a slide film, at B will be projected by the lens on to a screen (not shown) located at a suitable distance in front of the lens. Other essential elements of the system are also shown arranged along the optical axis. These include the light source assembly, here shown as a lamp 2, reflector 4, condensing lenses 8 and 10, and heat filter 12 to the rear of holder B. Holder B is here indicated simply by the member 6 in which is positioned a "slide transparency" having frame 7 and film 9. The lens system A is depicted simply as including a carrier body, as a sleeve 20, in which a composite lens unit 14 is adjustably mounted by a frictionally held screw thread connection. Manual focusing is accomplished by turning unit 14 in the sleeve.

Holder 6 serves to hold a slide film 9 in position to project an image and, as will be understood, the slides are removable for insertion of successive slides of like construction in the same holder. Various types of commercial equipment are common in the art for this purpose as will be appreciated. All the elements thus far schematically shown and described are well known and need not be further detailed. In conventional practice they are suitably mounted in a light-tight and ventilated housing (not shown).

In accordance with this invention the system is provided with an optical slide locating system or sensing means for determining the position of the film surface relative to the lens along the axis $x$. The sensing means in turn controls a servomechanism to correct, if need be, the position of the film. In addition a disabling switch renders the automatic focusing feature inoperative while a slide is being changed.

The slide locating system or sensing means comprises a small lamp 22 and a condensing lens 24 as a light source to direct a beam of light as at 26 onto the surface of the slide film 9 at an acute angle of incidence. It also includes a concave spherical mirror 28 receiving the reflected beam 26 which is reflected back by the mirror against the surface 9 of the film and thence to a beam splitting mirror 30.

Mirror 30 splits the reflected light to send divided portions of the beam to photoelectric cells 32 and 34 located at each side of the mirror. Suitable brackets 36 and 38 are fixed to the lens holder or carrier sleeve 20 to support the sensing elements. Lamp 22, lens 24 and splitting mirror 30 with cells 32, 34 are mounted by bracket 38 at one side of the lens and slide holder B. The sperical mirror 28 is mounted on bracket 36 at the opposite side. Axial movement of the carrier sleeve 20 as will be described thus carries the sensing elements in fixed relation to the projection lens system.

It will be seen from FIG. 1 that light source 22 and condensing lens 24 are placed very slightly above the horizontal centerline of the main projection system, and that beam splitter 30 together with photoelectric receivers 32, 34 are placed an equal angular distance below the centerline. This is done to avoid physical and optical interference between these two sets of elements, and does not significantly alter the primary behavior of the light beam as illustrated.

When a beam of light indicated at 26, FIG. 1, strikes the surface 9 of a film disposed in an object plane which has been predetermined as the plane in which a sharp, clear, image will be projected on the screen, then the light beam will be reflected toward mirror 28, thence back to surface 9 as at 26′ and to mirror 30 where it will be divided by the latter to send beams of equal intensity to photoelectric cells 32 and 34 respectively. Under such conditions the power train of the servomechanism will not be activated and the lens unit will remain stationary.

In the example shown the servomechanism is designed to move lens carrier sleeve 20 relative to film surface 9 along the optical axis $x$, only when the distance between lens A and surface of the film 9 varies axially from the predetermined focused object plane position. In selecting a focused object plane position for films to be projected in using the equipment, any suitable "test" slide is first placed in holder 6. The servomechanism as will be described, is then connected to carry sleeve 20 to a position in which the beam splitter mirror 30 transmits light beams of equal intensity to cells 32 and 34 to bring the servomechanism in balance. At this balanced position of a particular lens-screen-slide system the operator then manually adjusts the lens 14 by turning it in sleeve 20 until the image of the "test" slide is in clear, sharp focus on the screen. Once the equipment is so focused, successive slides inserted in holder 6 will, if the film surface varies from that of the first slide, actuate the servomechanism to bring each slide into a correctly focused position on the screen automatically and without further attention from the operator.

Movement of sleeve 20 is accomplished through a servomechanism power train controlled by the cells 32 and 34 and activated whenever the sensing means indicates a deviation in position from an established focused object plane. The sensing means indicates the deviation by an unequal splitting of the reflected light beam.

Cells 32 and 34 are any suitable photoelectric cells of a character to control an electric circuit in response to the amount or intensity of light focused upon them. Thus, each photoelectric cell is a means for detecting and measuring the amount of light reflected toward it by the mirror 30 and producing an electric current proportional to the amount of light gathered from mirror 30. Cells 32 and 34 are connected to any suitable known null bridge 42 supplied with power from source 43 and connected to amplifier 44 to deliver current to any suitable reversing motor 46. Reversing motor 46 constitutes the drive, through a reduction gearing indicated at 48, for moving sleeve 20 by a suitable linkage such as the pinion 50 and rack 52 on sleeve 20. The arrangement is such that when any light received by cells 32 and 34 is equal, the bridge circuits are balanced and no current is delivered to motor 46. Thus it remains stationary. However, if one cell received more light than the other, it unbalances the bridge circuits. The current generated by such signalling turns motor 46 in a direction to drive sleeve 20 and move the light reflecting elements into an adjusted position in which the light beam again delivers rays of equal intensity to cells 32 and 34 and the bridge circuits are in balance. Thus the axial distance between the lens and plane of the film is re-established. In other words the film is automatically placed in the pre-selected focused object plane position with respect to the lens.

A disabling switch 54 is also connected in circuit with the bridge to control the drive mechanism and deenergize bridge 42 except when a slide is inserted in holder 6. Thus unnecessary hunting of the mechanism is eliminated while slides are being changed.

Certain further relationships in the optics and geometry of the system disclosed should be noted for operation in the desired manner and to obtain adequate sensitivity. As will be seen in FIGS. 2 to 4 the spherical mirror 28 is located with its center of curvature $c$ coincident with the central portion of the reflective surface of film 9 when the film is at its correctly focused position relative to the lens system.

With reference to FIG. 2 the operation of the system is diagrammatically illustrated for a condition in which the film surface of a subsequent slide may be in a position displaced from the properly focused object plane along the optical axis of the projector. This may be caused, for example, by a variation in the placement of the film with respect to its cardboard mounting, a variation in the thickness of the framing itself, or by a bowing of the film. In FIG. 2 a full line representation of film surface 9 is shown to indicate a focused object plane position of the film. The dotted line representation at 9′ is shown as a variation from that position. It will be understood that a beam of light transmitted by lamp 22 against the full line surface 9 would be directed by mirror 28 back to the film and to mirror 30 with the result that light rays of equal intensity are transmitted to cells 32 and 34. This is the balanced condition. Where, as shown, a film surface is incorrectly positioned as at 9′, the light source 22 strikes the film as at point $r$. It is then reflected back by mirror 28 toward its center of curvature $c$ coincident with the geometric center line of slide 9 (full line). This light, however, now strikes the film surface 9′ as a point such as at $s$ which is off center. As indicated a greater amount of the reflected light will therefore now be transmitted along the path indicated at 25 and to that side of mirror 30 which is directed toward cell 34. As a result the circuits of bridge 42 are unbalanced and the servomechanism moves sleeve 20 until lamp 22 and mirror 28 are positioned to direct light rays of equal intensity to cells 32 and 34. In this adjusted position of the sensing elements, the distance between surface 9′ and the lens is identical with the spacing determined when the focused object plane was initially established for the lens-screen system. In the particular example illustrated by FIG. 2 the lens would be moved as to the right.

Referring to FIG. 3, mirror 28 is again shown as located with center of curvature $c$ in coincidence with the central portion of the reflective film surface of slide 9, when the slide is in its correctly focused full line position. If the slide is improperly tilted in the slide carrier as indicated by dotted line representation 55, the light beam represented by 26 is reflected from the film along a new path 27 to concave mirror 28. However, since path 27 originates at the center of curvature of mirror 28, the light beam is reflected back to the same central point on the film and thence reflected along its original path to beam splitter 30. Equal amounts of light are thus reflected back to the photoelectric devices 32 and 34.

Referring to FIG. 4 a correctly focused full line position is again shown at 9 (as in FIGS. 2 and 3). A warped or buckled film surface showing an angular orientation about the center $c$ is indicated at 56. Here a new path 27' is reflected from the film 56 but from its center c which is the center of curvature of the mirror 28. Thus mirror 28 reflects light back to the film along path 27' and thence along original path 26 to the beam splitter 30 and equally to cells 32 and 34 as in FIG. 3.

It will thus be seen that the slide locating system is sensitive to longitudinal positioning of the slide (FIG. 2) and insensitive to angular orientation of a slide about the center of curvature c (FIGS. 3, 4).

For greatest sensitivity condensing lens 24 is positioned to so focus a light beam as to form an image of light source 22 on beam splitter 30. So focused, the light beam covers an appreciable area of the mid-portion of slide 6. Its function in locating the plane of the film is consequently averaged over the area. Thus, imperfections and slight surface warping of the film do not cause operation of the focusing system. In addition, by this arrangement if accurate focus of the entire film is not obtainable, at least the central portion of the slide will be in focus even if the slide is badly deformed or warped. Usually the point of interest of a slide is located in the center of a picture so that all pictures are focused to maximum advantage.

In the embodiment of the invention as described and illustrated focusing is accomplished by holding the slide film 9 and its holder stationary and moving lens 14 and lens carrier sleeve 20 by means of the servomechanism. It will be apparent that an equivalent result may be obtained by reversal of function, that is, by fixing the lens and sleeve and moving the slide and holder 6 along the optical axis of the projector by the servomechanism. The latter arrangement would be preferred in certain optical apparatus, such as enlargers, where the film mount would be more readily adaptable to small movements. On the other hand the arrangement as described is more suitable for automatic slide changing projectors where slide holder 6 is fixed relative to other parts of the conventional equipment such as a slide magazine and guides.

This invention has been described as applied to projectors for transparent objects. However, it will be seen that it is equally useful in projectors for opaque objects, such as metallurgical microscopes and microfilming equipment, and in fact for any optical system used to successively focus real objects, each having an approximately plane face of sufficiently specular reflectivity at low angles to direct a sensing light beam such as the beam 26.

What is claimed is:

1. An automatically focusing photographic film slide projector apparatus comprising a movable lens holder and lens having adjustable means for a manually focused setting of said lens, a stationary slide holder for successively mounting slides in spaced relation to said lens, a light beam transmitting means carried by said lens holder at one side of said slide holder for directing a beam of light against the surface of said slide and a concave spherical mirror reflector having a center of curvature coincident with the mid-point of a properly focused film slide, said reflector being carried by said lens holder for redirecting said beam of light back against the surface of a slide and means for dividing the reflection from said slide surface of the redirected beam of light into equal portions at a longitudinal position of said slide when in properly focused position relative to said lens, a photo electric responsive means and a servomechanism operated thereby maintaining a balanced condition when the divided portions of said light beam are equal, and including means responsive to unbalanced condition of said beam for moving said lens holder in a direction to establish said equally divided condition of the beam.

2. An automatic optical focusing system comprising a projection lens, means for holding objects at a focused object plane of said lens, means for relatively moving said lens and holding means, a light source disposed on one side of the object holding means, a concave spherical mirror disposed on the opposite side of said holding means and having the center of curvature of said mirror arranged to be coincident with the center of an object disposed at the properly focused object plane of said lens, a beam splitting means disposed on the same side of said holding means as said light source and positioned to receive a light beam transmitted from said source to the object and reflected towards said mirror, and, by said mirror back to the object and finally to said splitter, and means responsive to deviations from an evenly split reflected beam caused by a change of longitudinal relationship between said lens and the center portion of said object for actuating said moving means and re-establishing the desired relation between said lens and object holding means to automatically reposition successive objects to said focused object plane.

3. In an image projecting apparatus having automatic maintenance of focus and including a projection lens and a holder for an object whose image is being projected and wherein movement of a light beam reflected at an acute angle from the surface of said object indicates a change in the position of said object relative to said projection lens, the improvement comprising a concave spherical mirror having a center of curvature arranged at the midpoint of a properly focused object in the holder and located to redirect said light beam towards the surface of said object, and a light sensitive mechanism for receiving the second reflection from said object, said light sensitive mechanism including means to cause relative movement between said projection lens and said object and maintain a preset focused relationship between the two.

4. Automatic optical focusing system comprising a projection lens, means for holding objects at the focused object plane of said lens, means including a concave spherical mirror centered at the mid-point of said focused object plane for sensing deviations in the location of objects relative to said focused object plane, means for generating a signal which is a function of said deviations, and means for relatively moving said lens and said object holding means to automatically correct said deviations.

References Cited by the Examiner

UNITED STATES PATENTS

| 2,947,215 | 8/1960 | Mitchell | 88—24 |
| 3,037,423 | 6/1962 | Shurcliff | 88—26 |
| 3,205,766 | 9/1965 | Ewald et al. | 88—24 |

FOREIGN PATENTS

| 903,962 | 10/1945 | France. |
| 823,404 | 11/1959 | Great Britain. |

OTHER REFERENCES

VEB, German application No. 1,127,617, published April 12, 1962.

NORTON ANSHER, *Primary Examiner.*

H. H. FLANDERS, *Assistant Examiner.*